United States Patent [19]

McCarthy, Jr.

[11] 3,708,050

[45] Jan. 2, 1973

[54] PRINTER CONTROL WITH MONODIRECTIONAL AND BIDIRECTIONAL PRINTING COMPATIBILITY

[75] Inventor: Justin H. McCarthy, Jr., Boca Raton, Fla.

[73] Assignee: International Business Machines Corporation, Armonk, N.Y.

[22] Filed: Oct. 26, 1970

[21] Appl. No.: 84,026

[52] U.S. Cl. ..................................197/1 R, 101/93 C

[51] Int. Cl. ..................................................B41j 3/12

[58] Field of Search..............67/1, 187, 90; 101/93 C

[56] References Cited

UNITED STATES PATENTS

| | | | |
|---|---|---|---|
| 2,578,771 | 12/1951 | Zint | 197/187 X |
| 2,863,549 | 12/1958 | Kelley | 197/133 R |
| 2,997,152 | 8/1961 | Dirks | 197/1 R |
| 3,036,685 | 5/1962 | Zint | 197/90 UX |
| 3,108,534 | 10/1963 | Preisinger | 101/93 C |
| 3,517,592 | 6/1970 | Kollar | 95/4.5 R |

*Primary Examiner*—Robert E. Pulfrey
*Assistant Examiner*—Clifford D. Crowder
*Attorney*—Hanifin and Jancin and Earl C. Hancock

[57] ABSTRACT

Logic is conditioned to respond as a function of whether or not a serial printer is capable of printing bidirectionally or monodirectionally. When a bidirectional printer is available, the logic modifies computer originated control signals so that bidirectional printing will be effected even though the computer controlled signals are formatted and sequenced for monodirectional printing control.

5 Claims, 7 Drawing Figures

INVENTOR
JUSTIN H. McCARTHY, JR.
BY Earl C. Hancock
ATTORNEY

PRINT RIGHT

| 4 | 2 | 1 |
|---|---|---|
| 0 | 0 | 0 |
| 0 | 0 | 1 |
| 0 | 1 | 0 |
| 0 | 1 | 1 |
| 1 | 0 | 0 |
| 1 | 0 | 1 |
| 1 | 1 | 0 |
| 1 | 1 | 1 |

PRINT LEFT

| 4 | 2 | 1 |
|---|---|---|
| 0 | 0 | 0 |
| 1 | 1 | 1 |
| 1 | 1 | 0 |
| 1 | 0 | 1 |
| 1 | 0 | 0 |
| 0 | 1 | 1 |
| 0 | 1 | 0 |
| 0 | 0 | 1 |

PRINTER CONTROL WITH MONODIRECTIONAL AND BIDIRECTIONAL PRINTING COMPATIBILITY

BACKGROUND OF THE INVENTION

1. Field of the Invention

This invention relates to control circuitry for serial printers. More particularly, this invention is concerned with circuitry for controlling the operation of a serial printer in response to computer originated commands and data. The invention is particularly useful in association with data processing equipment for generating control signals to a bidirectional printer even though the originating data processing equipment produces commands and data in sequences and formats normally associated with a monodirectional printer. The invention is particularly well suited for use with serial wire matrix printers but the application of the invention is not so limited.

Serial printers are printers which have either a single print element or a lesser number of printing elements than is necessary to print across an entire line. Typically the print element is moved over a specified distance in a horizontal direction and is actuated to effect printing at a plurality of locations during its travel. Serial printers generally either print a complete character at a time for each actuation of the movable print element or effect printing by composing a character through the actuation of a multiplicity of wires so that the characters are a composition of dots, bars or the like.

2. Description of the Prior Art

Commonly available printers generate printing either by actuating an entire line of elements at a time in the so-called line printing operation or compose lines by serially printing one character at a time in a manner somewhat similar to the operation of a typewriter. Although line printers have a relatively high operational speed, they suffer from complexity of control circuits and high cost of manufacture. Therefore, serial printers are attractive for many applications since they are relatively economic to manufacture and require simple controls as compared to line printers. Both types of printers have found relatively wide applications as an output device for data processing equipment.

Most serial printers compose a line of printed characters by printing from a left margin or starting point and sequentially printing until the line is complete. This completion of a line is followed by an indexing of the material on which the printing is being effected and a return of the printing element to the left margin or starting point before proceeding with the subsequent line of print. The difficulty with this operation is that the time required to return the element to the starting reference line is non-productive and reduces the speed of the printer significantly. Accordingly, the printing speed of a serial printer can be markedly increased by indexing the print element when a line is completed and then printing backwards for the next line instead of performing an element return.

Prior art printers which could perform bidirectional printing required the control signals established either by special purpose hardware or by the program in the data processing equipment to recognize when the print element was at the end of a line and to generate special commands and oppositely ordered print data to cause the printer to print in the opposite direction. As a result, the programs which are originated for controlling the printer must be tailored to the particular type of printer attached. That is, the program must include element return signals if it is to operate a monodirectional printer but must contain special commands to effect bidirectional printing if a bidirectional printer is to be controlled. The only alternative available is special purpose hardware which is expensive to fabricate and relatively complex in operation. An example of such special purpose hardware using multiple print heads each of which prints in several sequential positions is shown in U.S. Pat. No. 2,863,549 entitled "Subcycle Control for Serial-Parallel Printer" by Kelly. It is therefore highly desirable to be able to write programs so that a monodirectional printer would be controlled but to obtain the speed advantage of a bidirectional printer if it is available without having to rewrite the program. There is no such capability in existence in the prior art.

3. Summary of the Invention

The present invention encompasses logic circuitry which is effective when a bidirectional serial printer is available for converting computer originated commands and data that has been formatted and produced for monodirectional printer control in such a manner that bidirectional printing will result. The computer originated control signals for a monodirectional serial printer typically would include print element return signals at the completion of each line printed. The present invention responds to the availability of a bidirectional printer by ignoring those element return signals and printing in a backward direction except when the printing element is located at a margin or starting reference point. Generally this margin or starting reference point would be the left margin of the line of print. The invention can be arranged so that this bidirectional printing will be accomplished by sensing a line level signifying that a bidirectional printer is attached. Alternatively the present invention can perform the bidirectional printing in response to a special bit associated with the command which initiates printing. That is, the logic circuitry of this invention can be selectively enabled by either a special bit in the program, by a special signal signifying the availability of a bidirectional printer or by a combination thereof. Thus it is possible to obtain bidirectional printing from a computer program written for monodirectional print control at the selection of the programmer or as a hardware function or both.

The present invention further contemplates responding to the decision to print in a direction opposite from normal by modifying the order of retrieval of the data relating to the particular character sequence so that the completed line will read properly even though printed backwards. This results in the embodiment described later from retrieving data bytes corresponding to character counts, increasing the storage address in accordance with that count so as to start data retrieval at the maximum location and thereafter effectively decrementing the storage address referencing instead of incrementing as is normally performed. A further refinement available in association with the present invention relates to the means of generating command signals for a serial wire matrix printer so that these commands are obtained in reverse order when printing in a reverse direction. The manner of generating such sequential commands for a typical system is shown in the IBM Technical Disclosure Bulletin of July 1970 (Vol. 13 No. 2) at pages 343 – 344 in the article entitled, "Read Only Storage Computer Code to Dot Matrix Translator," by Onwiler et al.

An object of this invention is to provide circuitry which can produce bidirectional printing in response to computer originated control signals intended to operate a monodirectional printer.

Another object of the present invention is to produce bidirectional or monodirectional printer control signals as a function of the capability of the printer available.

Still another object of the present invention is to provide an arrangement for sensing that bidirectional printing is to be effected from monodirectional printer control signals by appropriate modification of those monodirectional control signals.

Yet another object of this present invention is to permit bidirectional printing from monodirectional print control signals by sensing the availability of a bidirectional printer, causing the printer to print in a direction opposite to normal whenever the print element is not at a reference position and reversing the order of print data retrieval during reverse direction printing.

A further object of this invention is to respond to special command signals so as to provide opposite direction printing for a serial printer except when the print element is at a reference starting point.

A still further object of this invention is to respond to the presence of a computer originated control signal to effect printing in one direction and to respond to the absence of such signal to print in the opposite direction.

An additional object is to provide circuitry for controlling the direction of printing as a function of a computer originated command signal and the location of the printing element.

The foregoing and other objects, features and advantages of the present invention can be more fully understood from the following detailed description of this present invention.

DETAILED DESCRIPTION

Figure 1:
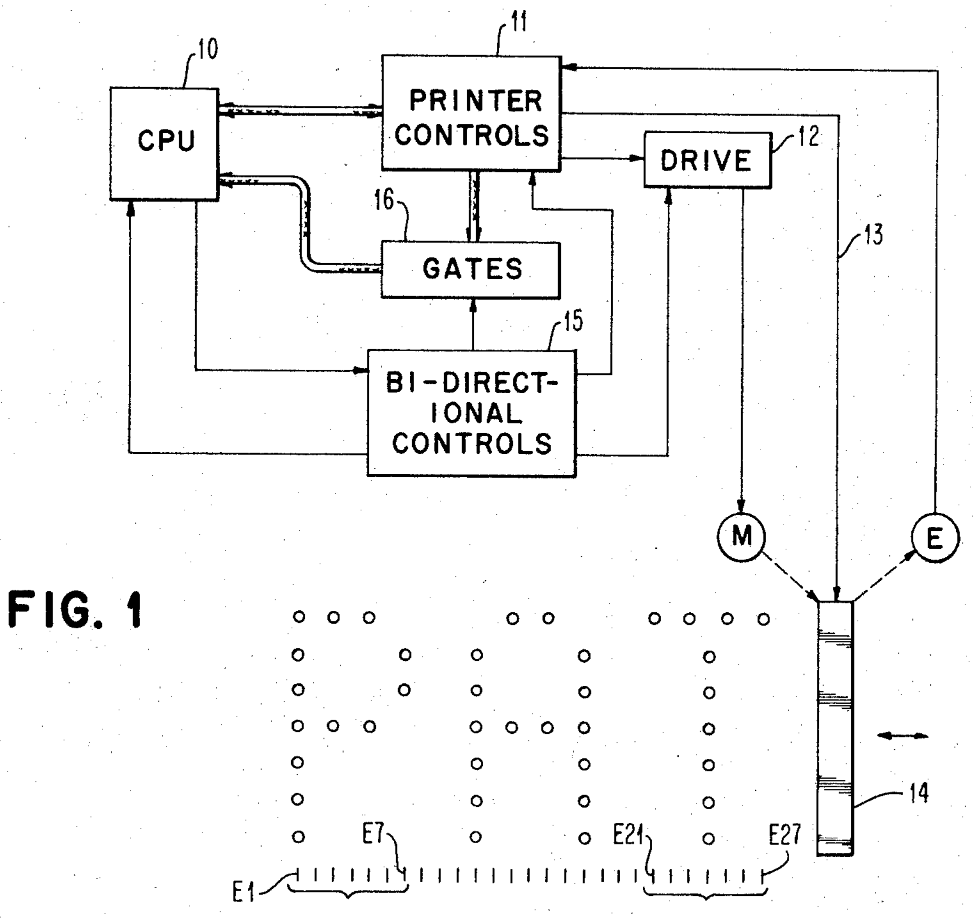
FIG. 1 illustrates an embodiment of the present invention particularly as it might be utilized for a serial wire matrix printer control.

FIG. 1 shows the general block relationship of one embodiment of this invention in association with other control elements employed in the prior art for serial wire matrix printer operation. More particularly, central processing unit CPU 10 generates command signals to printer controls 11 which are interpreted thereby to perform various functions such as energizing drive circuits 12 and thence an appropriate motor M for positioning of wire matrix print head 14. CPU 10 also supplies data signals identifying the characters to be printed. Emitter signals from detector E reflect the position of head 14 and are returned to printer controls 11 which uses those signals in conjunction with the aforementioned data signals to generate appropriately timed firing pulses over cable 13 to actuate selected print wires. The IBM Technical Disclosure Bulletin article by Onwiler et al. mentioned previously provides detail on the manner these print signals can originate via an ROS. A typical wire matrix print head which could be adapted for use in this invention is shown in U.S. Pat. No. 3,108,534, "High Speed Printer," by Preisinger which is assigned to the same assignee as this application.

A typical monodirectional serial wire matrix printer operation would be effected to print the characters "-PAT" as shown by starting movement of the print head from the left margin, generating a command signal upon the occurrence of emitter pulse E1 so that the seven dots are printed in the first column as shown while the head 14 is moving towards the right and continuing to respond to appropriate emitter pulses through E27. Upon completion of the printing of the line, the paper or other material receiving the printed characters is usually indexed upwards for one line and an element return signal is generated to cause head 14 to be moved back to the left margin once again.

The present invention modifies such monodirectional controls by the inclusion of bidirectional controls 15 which sense that the printer controlling the movement of head 14 is capable of supporting printing regardless of its direction of movement. Accordingly, the presence of head 14 at other than the left margin will cause controls 15 to modify the sequence of data characters as received from CPU 10 so that they will be presented in a reverse order while head 14 is being moved towards the left. This is executed by retrieving the count of the number of characters to be printed from CPU 10 and controls 11, returning this count to CPU 10 through gates 16, adding the count to the address of the data in the storage in CPU 10 and thereafter decrementing this address referencing instead of incrementing as would typically be performed in printing from left to right. A relatively high degree of flexibility is available since CPU 10 can be programmed to selectively enable or disable bidirectional controls 15. When enabled, controls 15 cause right to left printing at any time other than when the head 14 is at the left margin, whereas, when controls 15 are disabled, normal left to right monodirectional printing will result.

Figure 3:
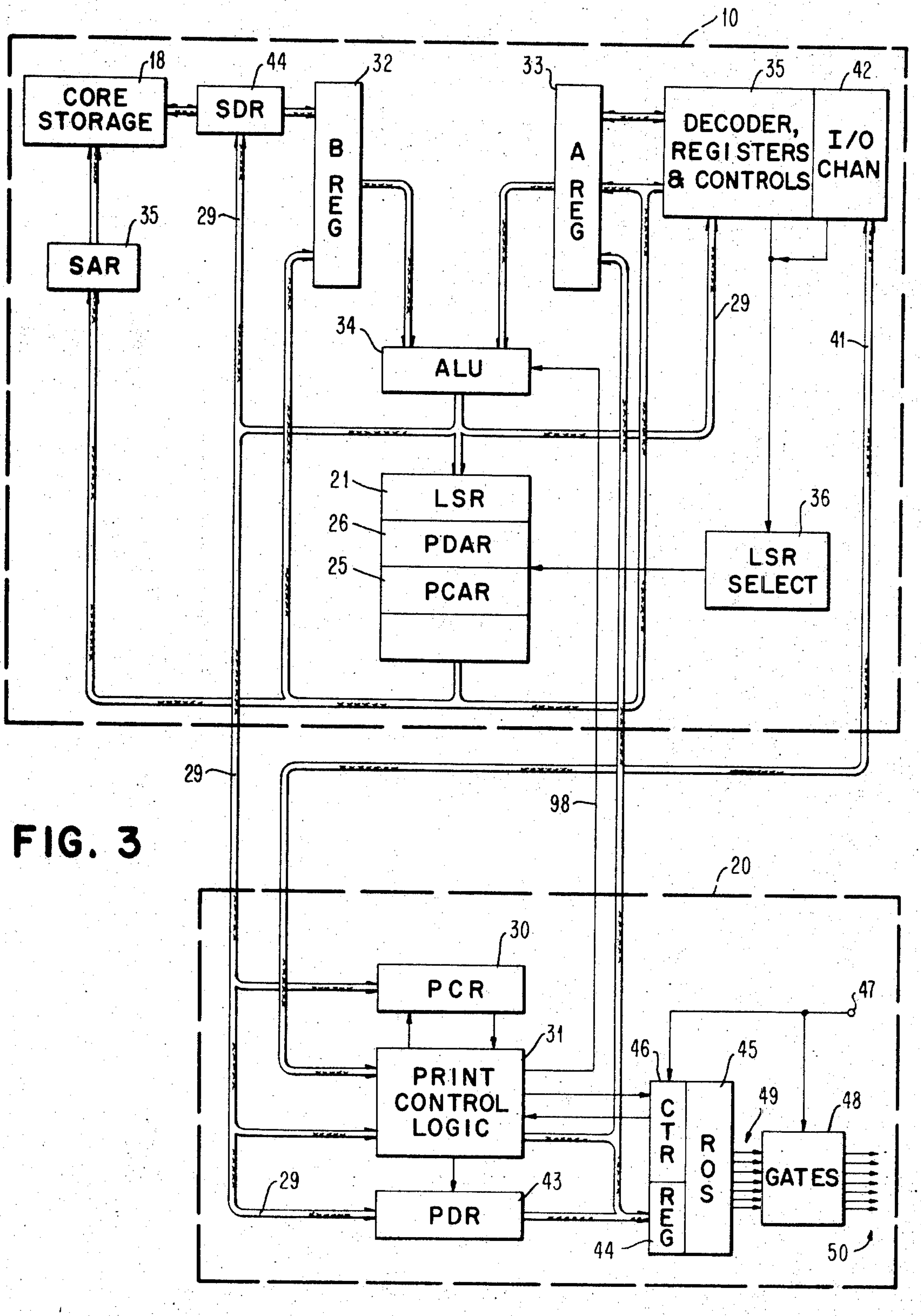
FIG. 3 shows a more detailed arrangement of an embodiment of the present invention with some amplification upon its association with a computer.

FIG. 3 depicts the present invention as it would be incorporated in a printer control attachment 20 in association with the components of a CPU 10. The various components of CPU 10 as shown in FIG. 3 are well known in the art as are the operative interrelationships thereof. Accordingly much of the detail of those components and their operation will be omitted from this description in the interest of brevity. The present invention can be readily modified to operate with any computer configuration other than that shown.

Printer control unit 20 as illustrated in this embodiment communicates with CPU 10 in a semiautonomous manner on a cycle stealing basis with appropriate command interpretations. That is, control unit 20 is useful for controlling sequences of printer operations via cycle stealing while the CPU 10 is performing other functions. Local storage registers LSR 21 contain two registers dedicated for addressing core storage 18 on a cycle steal basis. These registers are print command address register PCAR 25 and print data address register PDAR 26. PCAR 25 is used to retain the address in storage 10 of the command or count byte involved in a printer operation. PDAR 26 is used to contain the address in storage 18 of the data byte which defines the character to be printed. By appropriate programming sequences preceding a print operation, registers 25 and 26 are initialized by placing the address of the first command into 25 and placing the address of the first data field associated with that print command into PDAR 26. A Start I/O instruction is included in the program to thereafter initiate operation of the printer. This Start I/O is composed of three bytes of data as shown in FIG. 2. These bytes are retrieved by sequential machine cycles during program execution through state-of-the-art use of the instruction address register and controls contained in block 35. They effect interfacing with the I/O devices through I/O channel 42 and the various busses in a manner also well known in the art. The IOP field defines that a printer operation is to be performed, the IQ byte identifies the specific address of the device to be actuated and the IR byte contains special condition bits, one of which relates to the effecting or disabling of bidirectional printing as will be discussed later herein. Obviously a single byte could perform the functions of these three bytes if only one I/O device is attached and sufficient bit positions are available in the IOP byte to effect the special condition flagging. For control unit 20, only one such special bit is required. However, it is frequently the case that a multiplicity of control units such as 20 are attached in parallel to CPU 10 as is well known in the art. Only one such control unit is shown.

The Start I/O instruction from CPU 10 directs control unit 20 to utilize a cycle steal to obtain an action command (CMD STL in FIG. 2A, for instance) from data bus 29 for placement in print command register PCR 30. Print control logic 31 interprets the command and causes its execution through cycle stealing. Commands involving sequences of similar operations such as a print command are immediately followed at the next address in storage 18 by a count field which defines the number of times that the command function is to be performed. For instance, print commands can have a series of characters to be printed, tab commands can require the movement of the print element for a plurality of spaces, and vertical skip operations can involve multiple movements of the medium on which the printing is to be performed. Some commands may involve a single operation such as vertical indexing or element return. The description of the embodiments of the present invention are primarily concerned with responses to printing commands, however.

After loading the initial command into PCR 30, from the address identified by PCAR 25, the address in PCAR 25 is incremented by A and B registers 32 and 33 and ALU 34 before it is returned to PCAR 25. Thus the address of the count field associated with the command in PCR 30 is immediately identified in PCAR 25 and control unit 20 places this address in storage address register 35 so as to retrieve the count field from storage 18. This count is decremented by control logic 31 by means of A register 33 and ALU 34, inspected to determine whether or not it equals zero or some predetermined end number and returned to storage 18 at the address contained in PCAR 25. If a count field goes to the predetermined end number on the first retrieval, logic 31 interprets this as meaning a single command function is to be executed such as the printing of a single character if a print command is in PCR 30. Either a command retrieval signal through bus 29, bus 41 and I/O channel 42 or a count field retrieval signal by this same route will cause a reference to the storage address defined by the content of PCAR 25. For a command retrieval signal involving a multiplicity of similar operations, the address in PCAR 25 is incremented by one after PCR 30 is loaded. Conversely, a count field retrieval signal on bus 41 into I/O channel 42 results in no change in the address in PCAR 25 until logic 31 detects that the count field from storage 18 has been decremented to zero or some predetermined end count. The commands, count fields, and data are all retrieved through storage data register 44 and B register 32, ALU 34 and bus out 29. However the count field is decremented in ALU 34, inspected by logic 31 and returned to storage 18 through SDR 44. Cycle steal operation in conjunction with the present invention is substantially the same as has been well known in the art in that the computer is effectively under the control of the I/O control unit. Processor 10 responds to signals on cable 41 to perform the requested functions during a cycle steal for the FIG. 3 embodiment. That is, the control unit 20 must provide control signals via 41 as appropriate during a cycle steal to transfer the content of PCAR 25 or PDAR 26 to SAR 35 during the first part of a cycle steal if there is to be a data flow from storage 18. The second portion of that cycle steal must be used to update the address in PCAR 25 or PDAR 26 as applicable as well as the incrementing or decrementing and/or returning of bytes into storage 18. A typical arrangement for performing chaining of print commands is discussed in the IBM Technical Disclosure Bulletin of July 1970 (Vol. 13, No. 2) at pages 464 – 465 in the article entitled, "Random Command Stacking and Core Storage for Print Control," by the same inventor as this application.

Figure 2A:
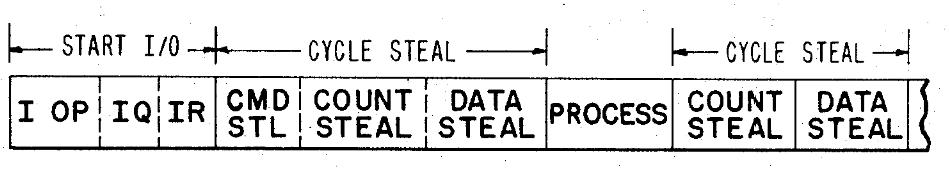
FIGS. 2A and 2B show two typical sequences of computer machine cycles as they might occur for controlling an embodiment of the present invention via cycle stealing.

As can be seen from FIG. 2A, three cycle steals are utilized to cause printing to occur. The Start I/O instruction identifies: (A) that an I/O operation is to be performed (IOP), (B) which I/O device is to perform the operation (IQ) and (C) any special control functions associated with that operation (IR). The control unit 20 thus initiated will immediately invoke the first cycle steal CMD STL to retrieve the command for PCR 30 and decode it. For exemplary purposes, it is assumed that this command is to print one or more characters. As a result, another cycle steal is taken to retrieve, decrement and inspect the count field which is at the next sequential address in storage 18 from the command. The count field specifies the number of characters that are to be printed and is returned to the same storage address identified by PCAR 25 after decrementing and inspecting by logic 31. Subsequently a cycle steal to retrieve data is taken. In this case, the byte defining the actual character to be printed is retrieved from storage at the address in PDAR 26. This byte is placed in print data register PDR 43 where it is used to form part of the address for read-only-store ROS 45 via register 44. the address of ROS 45 is completed by counter 46. When logic 31 has loaded register 44 and enabled counter 46, the next pulse from emitter E which is introduced to terminal 47 will result in incrementing of counter 46 so that the address for ROS45 formed by the combination of register 44 and counter 46 will be translated through ROS45 and selected output lines 49 will be energized. After an appropriate delay to allow the signals on lines 49 to settle, this same emitter E pulse will pass the levels of lines 49 through gates 48 to activate appropriate lines into output 50 with each of the lines at output 50 being connected to energize a respective one of the wire print elements in print head 14. Thus, if the leftmost print position of the character "P" in FIG. 1 were being printed, the E1 pulse would raise all output 50 lines. The E2 pulse then increments counter 46 thereby changing the address reference into ROS 45 so that only two print wire levels are raised when the head 14 has been moved to the next print position. This causes the two dots in the second column of the "P" to be printed. This sequence continues until counter 46 is returned to zero which logic 31 interprets as the end of the printing of that character. This operation is described in the aforementioned IBM Technical Disclosure Bulletin article by Onwiler et al. Since counter 46 must be incremented from zero before any signal appears on lines 49, register 44 need not be separate circuitry but could be merely the parallel output (or raw data) lines corresponding to the content of PDR 43. The operation of control logic 31 to gate the incrementing pulses into counter 46 for reverse printing will be discussed for FIG. 5.

During this printing operation, CPU 10 has been freed to perform other tasks as is reflected in the "-Process" block of FIG. 2A. CPU 10 could likewise have been freed for other operations including other cycle steals prior to or following each of the cycle steal operations shown. Eventually control unit 20 will take another cycle steal to again retrieve the count field from the storage 18 address defined by PCAR 25, decrement that count and return it to the same storage 18 address after inspection for zero. This is immediately followed by another cycle steal to increment PDAR 26 by one and retrieve the data byte in storage 18 at that address. This new data byte is loaded into register 44 via PDR 43 and another printing operation cycle using ROS 45 is performed substantially as described hereinbefore. If the count field had been found to have gone to an end count such as zero just before a print operation and a chaining bit had not been set, control unit 20 would generate a signal to I/O channel 42 indicating that the operation was completed immediately after printing of this last character. If the chaining bit is set, control unit 20 responds to completion of the last character printing by taking a cycle steal to increment PCAR 25 and retrieve the next command at the next sequential address in storage 18.

The foregoing description relative to FIG. 3 is based upon CPU 10 originated control signals from a program that is written to control a monodirectional printer (e.g.: left to right printing only). The prior art printers require this program to include a special command directing control unit 20 to return print element 14 to the left margin before the next line can be started. By the present invention, this element return is not necessary if a bidirectional printer is being controlled and only an indexing of the medium on which the printing is to be performed need be done to be in position to print a new line. As will be more fully understood from FIGS. 4 and 5, the present invention makes it possible to write programs of bidirectional printing with this same program. Broadly, the order of data retrieval is reversed for reverse direction printing and, as a further option, the order of wire printer actuation is likewise reversed if a wire matrix printer is being used.

Figure 2B:
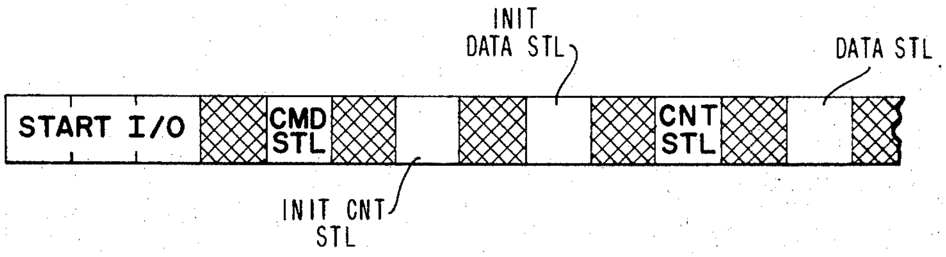
Figure 4:
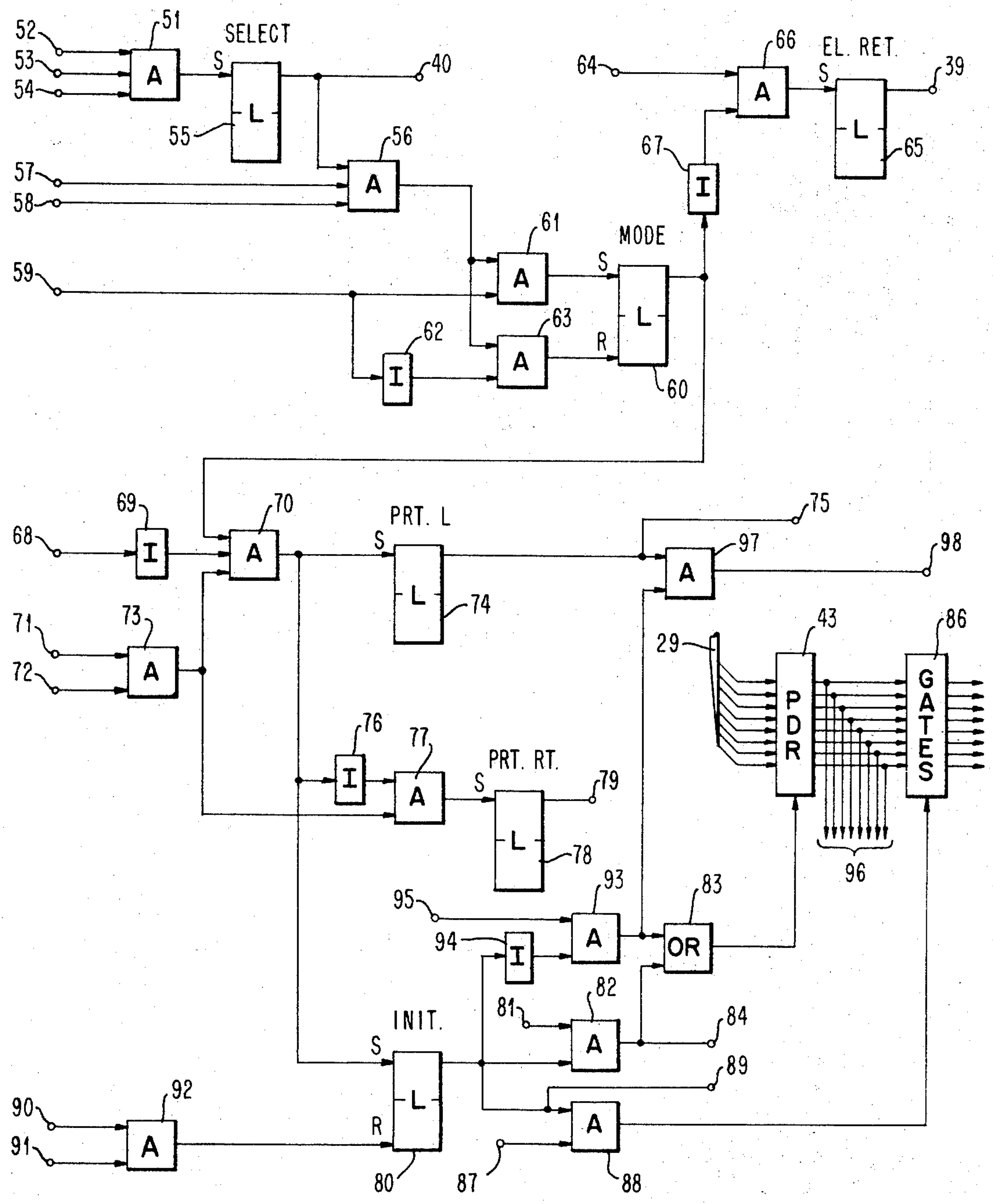
FIG. 4 is a somewhat more detailed circuit arrangement of portions of the print control logic and associated circuitry shown generally in FIG. 3.

The logic circuitry of FIG. 4 depicts one way the present invention can be implemented in the print control logic 31 of FIG. 3. A typical sequence of machine cycles for the operation of the FIG. 4 circuit is shown in FIG. 2B wherein the shaded blocks represent portions of time during which the CPU might be freed for other processing functions if desired. AND 51 responds to the presence of three input signals, one on terminal 52 indicating that CPU 10 is processing a Start I/O instruction, one on terminal 53 specifying that the IQ cycle of the Start I/O instruction is present and a third signal at 54 which denotes that the address of the particular control unit 20 has been decoded. The signals on 52 and 53 are produced from the I/O channel whereas the signal on 54 would typically be the output of a decoder in the control unit recognizing its own address. When all of these signals 52 – 54 occur simultaneously, select latch 55 is set. In addition to the other operations which the set output of latch 55 controls such as the initiation of cycle stealing, this output provides one conditioning signal for AND 56. The I/O channel would provide the second input 57 when the special condition or IR cycle byte is being processed from the same Start I/O instruction of FIG. 2B which had set latch 55. The input to terminal 58 is a signal returned from the printer if it is capable of performing bidirectional printing. Thus a monodirectional printer attached to the control unit would not provide an input to 58 and, as a result, AND 56 could not produce an output. The ultimate effect of this is that the printer would be controlled as a monodirectional printer in the same manner as has been described hereinbefore. Additionally, it will be recognized from the following description for FIG. 3 and/or FIG. 4 that certain elements of the logic are only required if a bidirectional printer is attached. Thus if those elements are included in the logic only when a bidirectional printer is attached in fact, then input 58 can be omitted.

If the conditions required to produce an output from AND 56 are all present, this signifies that an inspection can be performed to determine whether or not the program being executed in the CPU is intended to take advantage of the bidirectional capability. Such a signal is provided by setting a particular bit in the IR byte of the Start I/O instruction being processed. This bit is placed on the bus out 29 (FIG. 3) during the IR cycle, detected to provide input 59, and ultimately sets mode latch 60 via AND 61. Conversely the absence of this signal at 59 during the IR cycle will insure that latch 60 is reset via invert 62 and AND 63. Therefore, mode latch 60 will set only when the program indicates that the bidirectional printing is desired. As will be seen from the following description of a typical configuration, the setting of latch 60 results in printing from right to left when executing a given print command except when the print element 15 at the left margin.

As mentioned previously, the invention is intended to operate a bidirectional printer despite the fact that the program being executed by the processor is written to control a monodirectional serial printer. This means that element return signals when generated must be ignored. These element return signals are introduced at an appropriate time to terminal 64. For monodirectional printing, they would set element return latch EL RET 65 with its output initiating the element return. Under such circumstances, latch 65 would be reset by means not shown when the element return was completed. However, the setting of mode latch 60 as previously described would remove the conditioning input for AND 66 via invert 67 and prevent latch 65 from responding to an element return signal at 64. When an element return is completed for monodirectional printing, a signal usually is returned to the CPU 10 indicating this fact and must be received by CPU 10 before the program can proceed. Accordingly such a signal can be simulated via FIG. 4 by ANDing input 64 with the set output of mode latch 60 to set yet another latch although this simulation circuitry is not shown. Frequently the element return signal and a signal specifying the indexing of the medium on which printing is being done are both represented by distinctive bits within the same command byte. In such situations, completion of the indexing is enough and simulation of the element return completion is not necessary.

A detector which senses the presence of the printing head or element at the left margin would provide an input at 68. When such an input is present, invert 69 would prevent AND 70 from being conditioned. However, invert 69 will be conditioning AND 70 at any time the print head is at a position other than the left margin. Signals from the control unit on terminals 71 and 72 designate that a print command has been received from the control unit and that a command steal is in process, respectively, to produce an output from AND 73. The print command in this case was detected during the command cycle steal CMD STL shown in FIG. 2B. When all of these inputs for AND 70 coincide, print left latch PRT. L. 74 will be set and its set output on 75 causes the print head to move from right to left or the reverse direction from normal. That is, reverse direction head movement and subsequent backward printing will respond to 75 which is a result of coincident indications that bidirectional printing is desired, the print head is not at the left margin, and a print command has been decoded in association with the cycle steal by the control unit for obtaining that command. If bidirectional printing has not been requested (i.e.,: latch 60 is not set) or the print head is at the left margin, normal or left to right printing is to be performed. This is accomplished via invert 76 which will condition AND 77 if AND 70 is not producing an output so that the output from AND 73 will set the print right latch PRT. RT. 78. Normal left to right printing would result in response to the set output 79.

The data representing characters to be printed as present in the CPU storage is arrayed at sequential addresses that would correspond to normal left to right printing. The setting of print left latch 74 and printing of characters in response to data retrieved from storage in the same order that it was placed there would produce a backward reading line of print but this is prevented by the circuitry about to be described. More specifically, the output of AND 70 also sets initializing latch INIT. 80. The next cycle steal shown as INIT CNT STL in FIG. 2B is used for the purpose of obtaining the count field from storage in the CPU with the presence of this special count cycle steal being signified by an input at 81. AND 82 responds to produce a signal through OR 83 to gate the count field into data register PDR 43 from data bus out 29. The output of AND 82 at output 84 is returned to the control unit or the CPU to prevent the decrementing by one usually performed on the count field during a count cycle steal. This can be effected by adding zero to the count field via A reg 33 while retrieving the count field through B reg 32 and ALU 34.

Register 43 usually is employed for addressing ROS 45. However, in this situation, the content of register 43 is gated via gates 86 back to A register 33 in the CPU to add to the contents of PDAR 26 through B register 32 and ALU 34. This gating is effected upon the next data cycle steal, INIT DATA STL in FIG. 2B, as is sensed by a signal from the control unit on terminal 87 which conditions AND 88 to complete the gating. The control unit responds to a signal at 89 to generate signals for the I/O channel to cause the aforementioned addition of the contents of PDAR 26 (FIG. 3) to the count from PDR 43 via ALU 34 and to return the result into PDAR 26. The address of data storage 18 at that point coincides with the last byte in storage for the line of characters to be printed. This is the data byte which will be initially retrieved and used to cause printing during reverse direction printing which follows. The fact that the initializing data cycle steal INIT DATA STL (FIG. 2B) is in process is indicated by a signal on input 90. The control unit produces a strobe pulse on terminal 91 at the end of that cycle steal thereby clearing latch 80 through AND 92.

The control unit further responds to the fact that latch 80 had been set by repeating the count cycle steal and data cycle steal as shown in FIG. 2B for the purpose of decrementing and inspecting the count field as described before and for obtaining the byte representing the first character to be printed in the reverse direction. The address of this byte is now present in PDAR 25. The reset of initialized latch 80 conditions AND 93 via invert 94. The signal on 95 occurs in the presence of the second data steal cycle so that the binary coded data byte from the processor can be gated into PDR 43 to control printing as discussed before through output leads 96. The output of AND 93 and the set condition of print left latch 74 condition AND 97 so that the signal on 98 will be returned to the ALU 34 to force it to subtract one from the PDAR 26 on each data cycle steal thereby decrementing it and oppositely addressing the string of data bytes stored in storage 18. The recovery of data bytes from storage, the decrementing of the count field and the control signals to the printer are otherwise the same as described hereinbefore except for the following discussion of FIG. 5 relative to reversed control of a wire matrix printer. Further, where otherwise not shown or discussed, reset signals are provided to the various latch circuits upon completion of the applicable operations.

Figures 5, 6:
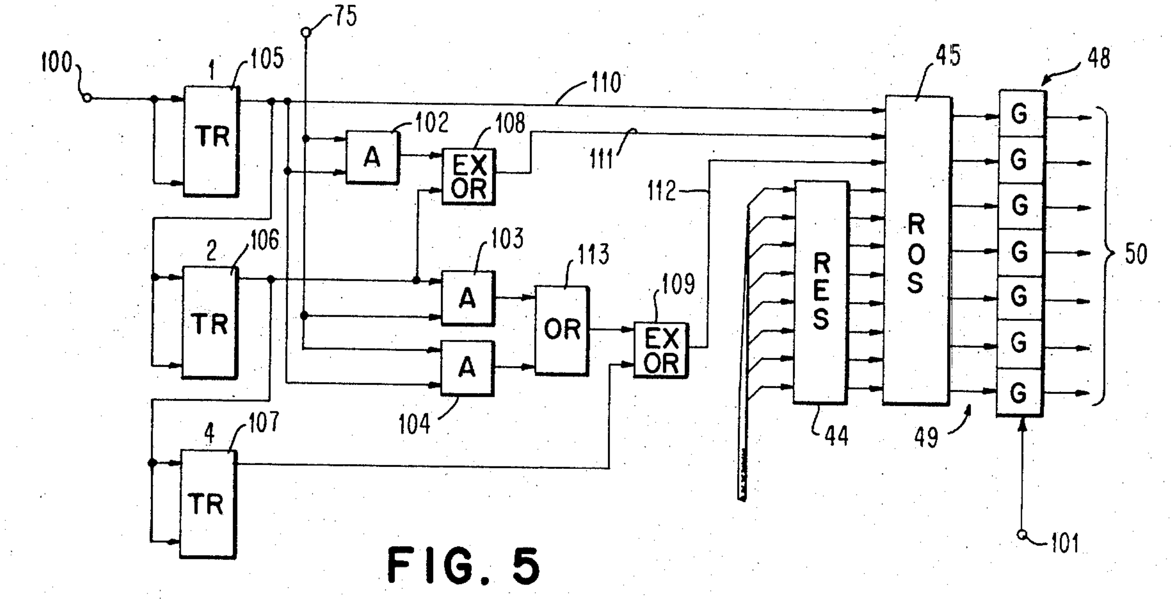
FIG. 5 contains logic circuitry for count sequence reversal in a manner particularly adapted to controls for a serial matrix printer.
FIG. 6 represents a table corresponding to the response of FIG. 5 to a series of input pulses and command signals.

FIG. 5 illustrates circuitry for reversing the incrementing count used to address ROS 45 during reverse direction printing. This circuitry is necessary since the usual sequential addressing of ROS 45 during forward printing would result in backward printing of each letter during reverse direction printing even though the data bytes were being retrieved in the proper order as discussed above. Broadly, the FIG. 5 circuit uses a common counter for both forward and backward counting with reverse counting being obtained by logically interpreting the counter content.

The emitter pulses E for incrementing the counter are gated into terminal 100 at appropriate times by the control unit. The output of latch 74, the print left latch, of FIG. 4 is introduced to terminal 75 which corresponds to the like numbered terminal in FIG. 4. An input at 75 designates that reverse counting is to be produced. In addition to input 75, note that the reference numerals employed for register 44, ROS 45, output lines 49 and gates 48 correspond to similar number components of FIG. 3.

The same emitter pulses E introduced to terminal 100 would typically be somewhat delayed before being introduced to terminal 101 to actuate gates 48. This delay is for the purpose of permitting the circuitry to settle prior to actuating the print hammers. Binary trigger circuits 105, 106 and 107 form a three stage counter to provide sequential counting to effect sequential address changing as part of the input in combination with register 44 for ROS 45. When reverse direction is not being employed, a signal is not present on 75 and the presence of a count in either 106 or 107 would cause exclusive OR 108 or exclusive OR 109, respectively, to generate output signals. Thus the count sequence on lines 110, 111 and 112 is the same as it would be if these lines were directly connected to the outputs of binary triggers 105, 106 and 107. However, when a signal is present at 75, AND circuits 102, 103 and 104 will be partially conditioned.

Initially there is no count contained in the three binary trigger circuits 105 – 107. As a result, the inputs for exclusive OR 108 and exclusive OR 109 will be the same and thus will provide no output. The effective result is that ROS 45 is not being addressed. A table is presented in FIG. 6 to show the relationship of the normal or "PRINT RIGHT" printing counts for the three output lines 110, 111 and 112 but identified by their binary significance (4, 2, and 1). That is, line 110 provides the address bit having a binary significance of one, line 111 produces the 2 level and the 4 level appears on 112. The Print Right column corresponds to the status of binary triggers 105 – 107 at any given time as well as the condition of lines 110 – 112 for normal or right printing. The Print Left columns of FIG. 6 corresponds to the line 110 – 112 status as correlated to the status of binary triggers 105 – 106 for backward or right to left printing.

For example, when binary trigger 105 contains a one and 106 and 107 are at zero (001 under Print Right), lines 110–112 will all be up for backward or reverse printing as is designated by the corresponding 111 under Print Left. Thus, when the first count is introduced to stage 105 from 100, the conditioning of AND 102 as well as AND 104 are both completed thereby providing divergent inputs for XOR 108 and XOR 109, the latter through OR circuit 113. The result is a signal being present on all three of lines 110, 111, and 112 as is symbolized by the FIG. 6 chart. The operation of this circuitry which reverses the count as seen by ROS 45 is self-evident from the table of FIG. 6 and will not be discussed further. It is readily apparent from the table that the sequence of addresses introduced to ROS 45 is, for the backward or left printing direction, exactly opposite in order from that of the normal or right printing direction.

The flexibility provided with respect to using data processing equipment or CPU for controlling a printer by the present invention can be realized by judicious application of the programming steps that become available. For instance, programming control can be employed when a line of print in the normal or left to right direction has been completed to inspect the next line of print and decide upon the most appropriate action to be taken. If the following or second line of print is equal to or shorter than the line just completed, the medium can be indexed to that line and an appropriate control bit inserted in the Start I/O instruction to set mode latch 60 of FIG. 4 and cause the initialization operation for backward printing as discussed hereinbefore. Sufficient blank characters or tabbing would be provided to return the print head to the end location of the second line and thence commence backward printing. If the second line is the same length as the first line, obviously tabbing or blank character printing would not be required and backward printing can be commenced immediately after initialization. For the circumstances wherein the second line is longer than the first line, right tabbing or blank character printing to the right can be performed to position the print element at the end of the second line before printing this second line in the reverse direction. In the latter case, the special control bit in the Start I/O instruction would not be generated until the print head is at the end of the second line.

Further it can be seen that printing could be effected across the entire length of a page without ever returning to a margin. This would be effected by judicious selection of the setting for the mode latch 60 in FIG. 4. That is, normal or left to right printing will always be performed as long as mode latch 60 is not set while backward or right to left printing will always be performed if mode latch 60 is set and the print head is not at the left margin. Accordingly the programming can be established such that the next line of print will be inspected immediately prior to, during or following the printing of a given line. This inspection can result in a logical decision generated as to the most expeditious positioning of the print for least movement prior to the initiation of printing for the next line. The inspection of the next line can indicate that the fastest printing can be accomplished by tabbing left or right as a function of which end of the next line is closest to the end of the line which is completed. Normal or reverse printing is performed after the print element has been appropriately positioned by indexing and/or tabbing. Decisions can be logically made as to whether or not to set the special control bit in the Start I/O instruction thereby causing printing in the proper direction as a function or whether the print head is in the beginning or end of the next line.

While the invention has been particularly described and shown relative to the foregoing embodiment, it will be understood by those having normal skill in the art that various changes and modifications can be made therein without departing from the spirit of this invention. For instance, although the signal introduced to terminal 68 in FIG. 4 is discussed as representing the positioning of print head 14 at a left margin, it should be understood that such a margin need not be the same physical location as between any two lines of print. That is, the input at 68 could represent the location of head 14 at or beyond a particular reference point with this reference point being dynamically specified from line to line or remaining fixed from line to line. Thus input 68 might be present when head 14 is at the extreme left edge of the paper for one line of print whereas, for the very next line of print, it might indicate that head 14 is at or to the left of the middle of the page. Various arrangements of hardware and/or programming controls to effect this will be readily understood by those having normal skill in the art.

What is claimed is:

1. Bidirectional printing control apparatus for a printer having at least one printing element which serially prints on a medium during relative motion between the element and medium and wherein printing is effected under control of data processing equipment which produces commands and print character identifying data signals in sequences appropriate for controlling such printing in a first direction only but wherein said data processing equipment is capable of producing a selection signal indicative that such printing is to be effected in a direction opposite said first direction if possible, said apparatus comprising first control means for generating a signal for causing relative motion between the medium and printing element in said first direction whereby printing is effected in accordance with said print data character identifying sequence, means for storing an indication of the occurrence of the selection signal and for providing an output indicative thereof, detecting means for producing an output indicative that the printing element is in a position which permits printing in the opposite direction, and second control means responsive to said outputs from said storing means and said detecting means for disabling said first control means, said second control means further including means for reversing the sequential order of the print data character identifying signals, and means for causing relative motion between the medium and printing element in the said opposite direction and for effecting printing in accordance with the print data character identifying signals from said sequence reversing means.

2. Apparatus in accordance with claim 1 wherein said detecting means includes means for producing an output whenever said printing element is at a limit position which precludes printing during relative movement between said printing element and said medium in said opposite direction, and which further includes means operable by said detecting means for preventing said second control means from responding to said storing means and detecting means outputs, whereby said printing element will move relative to said medium in said first direction under control of said first control means.

3. Apparatus for controlling a serial printer capable of bidirectional printing by at least one movable printing element wherein printing is effected under control of data processing equipment which produces commands and print character identifying data signals in sequences appropriate for controlling a monodirectional printer which prints in a first direction said data processing equipment utilizing a storage with a first field identifying the count reflecting the number of characters to be printed, a second field corresponding to said first field and including a sequence of said print character identifying signals located in sequential storage addresses which normally are addressed in a sequence corresponding to printing in said first direction, said data processing equipment being capable of preceding each of said sequences with an enabling signal reflecting that bidirectional printing is to be effected if possible, said controlling apparatus comprising means responsive to said enabling signal for storing an indication thereof thereby producing an output, means responsive to the absence of a stored said enabling signal for causing printing in said first direction in accordance with said sequence, detecting means for producing an output indicative that said printing element is in a position which permits printing in a direction opposite said first direction, sequence reversing means including a. means responsive to said storing means and said detecting means outputs for retrieving said count in said first field for generating an address for said storage corresponding to the last said print character identifying signal, b. means for retrieving said last print character for the initial character printing, and c. means for reversing the order of addressing said storage for retrieving said print character identifying signals beginning from the address of said last print character, means responsive to said detecting means output, said storing means and said sequence reversing means for causing said printing element to move in the direction opposite said first direction and to print in accordance with said reversed print data character identifying signals, whereby said printing element will move and print in said first direction in the absence of said storing means and detecting means outputs but will move and print in said opposite direction in the presence of said outputs.

4. Apparatus in accordance with claim 3 which further includes second detecting means for providing an output whenever the said serial printer being controlled is capable of bidirectional printing, and means for preventing said storing means from responding to a said enabling signal except in the presence of said second detecting means output, whereby printing will be effected only in said first direction whenever a monodirectional printer is being controlled regardless of the presence of said enabling signal or said detecting means output.

5. Apparatus in accordance with claim 3 wherein said data processing equipment is programmed to generate element return signals at the end of each printing of a line for causing said printing element to be returned to the proper position to start a subsequent line printing, said apparatus further including means responsive to the presence of said special enabling signal for preventing said element return signal from effecting movement of said printing element and for producing a signal to said data processing equipment simulating that the element return operation has been performed.

* * * * *